United States Patent
Karande et al.

(10) Patent No.: US 9,886,746 B2
(45) Date of Patent: Feb. 6, 2018

(54) SYSTEM AND METHOD FOR IMAGE INPAINTING

(71) Applicant: Tata Consultancy Services Limited, Mumbai (IN)

(72) Inventors: Shirish Subhash Karande, Pune (IN); Sandhya Sree Thaskani, Pune (IN); Sachin P Lodha, Pune (IN); Purushotam Gopaldas Radadia, Pune (IN); Mandar Shrikant Kulkarni, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/215,120

(22) Filed: Jul. 20, 2016

(65) Prior Publication Data

US 2017/0024864 A1    Jan. 26, 2017

(30) Foreign Application Priority Data

Jul. 20, 2015 (IN) ......................... 1612/MUM/2015

(51) Int. Cl.
*G06T 5/00* (2006.01)
*G06T 7/38* (2017.01)
(Continued)

(52) U.S. Cl.
CPC ............. *G06T 5/005* (2013.01); *G06T 7/11* (2017.01); *G06T 7/13* (2017.01); *G06T 7/38* (2017.01); *G06T 2207/10016* (2013.01)

(58) Field of Classification Search
CPC ........... G06T 5/005; G06T 2207/20081; G06T 2207/20084; G06T 5/50;
(Continued)

(56) References Cited

U.S. PATENT DOCUMENTS 7,760,913 B2 * 7/2010 Rahmes ................ G06T 5/005
382/100
7,764,810 B2 * 7/2010 Rahmes ............. G06K 9/00026
382/100
(Continued)

FOREIGN PATENT DOCUMENTS

WO    WO 2016050729 A1 * 4/2016 ......... G06K 9/00275

OTHER PUBLICATIONS

Suryawanshi, S.D. et al. (2015). "Exemplar Based Image Inpainting to remove object," *International Journal of Electrical, Electronics and Computer Engineering*, vol. 4, No. 1, pp. 1-4.
(Continued)

*Primary Examiner* — Jingge Wu
(74) *Attorney, Agent, or Firm* — Finnegan, Henderson, Farabow, Garrett & Dunner LLP

(57) ABSTRACT

This disclosure relates generally to image processing, and more particularly to system and method for image inpainting. In one embodiment, a method for image inpainting includes aligning a plurality of multi-view images of a scene with respect to a reference image to obtain a plurality of aligned multi-view images. A region of interest (ROI) representing a region to be removed from the reference image for image inpainting is selected. A dictionary is created by selecting image-patches from the reference image and the plurality of aligned multi-view images, and 3D rotations thereof. A priority value of each of a plurality of pixels of the ROI is created. The ROI is systematically reconstructed in the reference image based at least on the priority values of the plurality of pixels and the dictionary by computing a linear combination of two or more image-patches selected from the plurality of image-patches of the dictionary.

15 Claims, 5 Drawing Sheets

(51) Int. Cl.
*G06T 7/11* (2017.01)
*G06T 7/13* (2017.01)

(58) Field of Classification Search
CPC . G06T 2207/20021; G06T 2207/20221; G06T 7/11; G06T 7/13; G06T 7/38; G06T 7/337; G06K 9/6255; G06K 9/4604; G06K 2009/4666
See application file for complete search history.

(56) References Cited

U.S. PATENT DOCUMENTS

| | | | |
|---|---|---|---|
| 8,615,111 | B2 | 12/2013 | Garten |
| 2003/0146922 | A1 | 8/2003 | Navab et al. |
| 2011/0044521 | A1* | 2/2011 | Tewfik ................. G06K 9/6206 382/131 |
| 2011/0123113 | A1 | 5/2011 | Berretty et al. |
| 2012/0045095 | A1* | 2/2012 | Tate ........................ G06T 5/003 382/103 |
| 2013/0129207 | A1* | 5/2013 | Liu .......................... G06T 5/50 382/165 |
| 2013/0236090 | A1* | 9/2013 | Porikli ................... H04N 19/97 382/155 |
| 2014/0126819 | A1* | 5/2014 | Doepke ................. G06T 7/0028 382/173 |
| 2015/0006443 | A1* | 1/2015 | Rose ..................... G06N 99/005 706/12 |
| 2015/0178591 | A1* | 6/2015 | Fergus .................... G06T 5/005 382/157 |
| 2016/0012314 | A1* | 1/2016 | Ramamurthy ....... G06K 9/6244 382/160 |
| 2016/0239969 | A1* | 8/2016 | Davatzikos ............. G06T 7/003 |
| 2016/0321559 | A1* | 11/2016 | Rose ..................... G06N 99/002 |

OTHER PUBLICATIONS

Abe, A. et al. (2013). "Stereoscopic image inpainting considering the consistency of texture similarity," *Advances in Depth Image Analysis and Application*, pp. 1-8.

Jayachandran, P. et al. (Jul. 2013). "A Hybrid Method for Occlusion Removal," *International Journal of Application or Innovation in Engineering & Management (IJAIEM)*, vol. 2, No. 7, pp. 111-118.

* cited by examiner

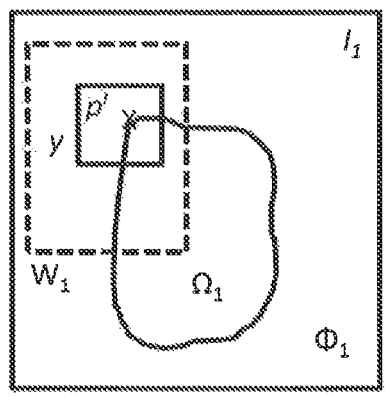
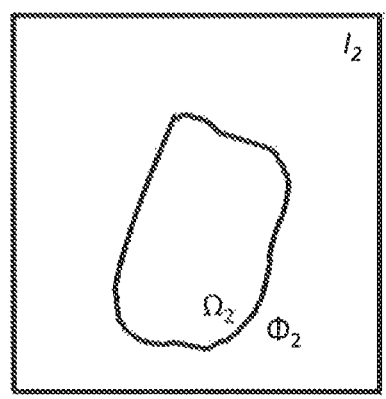
FIG. 3A    FIG. 3B
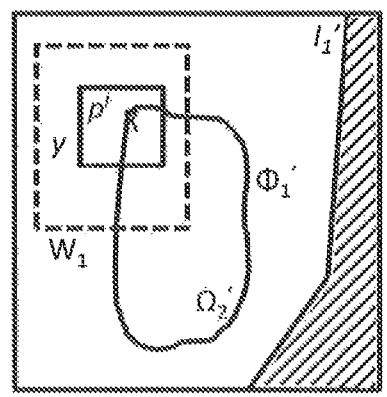
FIG. 3C

SYSTEM AND METHOD FOR IMAGE INPAINTING

PRIORITY CLAIM

This U.S. patent application claims priority under 35 U.S.C. § 119 to: India Application No. 1612/MUM/2015, filed on Jul. 20, 2015. The entire contents of the aforementioned application are incorporated herein by reference.

TECHNICAL FIELD

This disclosure relates generally to image processing, and more particularly to system and the method for image inpainting.

BACKGROUND

In recent times, amount of data pertaining to media content, such as image and videos has increased manifold. This data may be personal yet shared with a group of users of social networking websites, or may be publicly available on applications like Google™ Street View. Such media content may contain objects and/or private information, such as a car located at an undesired location, contact details, vehicle number, and so on. In such media content, people wish to avoid the private information before publishing on the social networking websites.

One way to remove any object(s) and/or the private information from the media content is by using an image inpainting technique. The image inpainting technique facilitates in removing undesired information from the media content and assist in maintaining privacy while preserving aesthetic quality of the images. Though the image inpainting technique has been extensively used traditionally, but the focus has primarily been on a single view image. Applying the image inpainting technique to remove the undesired information from the multi-view images is challenging and computationally intensive.

SUMMARY

Embodiments of the present disclosure present technological improvements as solutions to one or more of the above-mentioned technical problems recognized by the inventors in conventional systems. For example, in one embodiment, a processor-implemented method for image inpainting is provided. The method includes aligning, via one or more hardware processors, a plurality of multi-view images of a scene with respect to a reference image to obtain a plurality of aligned multi-view images. Further the method includes selecting, via the one or more hardware processors, a region of interest (ROI) in the reference image. The ROI represents a region to be removed from the reference image for image inpainting. Selecting the ROI in the reference image configures a hole to be filled in the reference image. Furthermore, the method includes computing, via the one or more hardware processors, a priority value of each of a plurality of pixels of the ROI. The priority value of a pixel of the plurality of pixels is computed based on a product of a confidence term and a data term, where the confidence term measures an amount of reliable information surrounding the pixel and the data term encouraging synthesis of a linear combination of image-patches based on the priority value. Moreover, the method includes creating, via the one or more hardware processors, a dictionary comprising a plurality of image-patches selected from the reference image and the plurality of aligned mufti-view images, and image patches obtained by 3-Dimensional (3D) rotation of image-patches selected from the reference image and the plurality of aligned multi-view images. Also, the method includes systematically reconstructing, via the one or more hardware processors, the ROI in the reference image based at least on the priority values of the plurality of pixels and the dictionary by computing a linear combination of two or more image-patches of the dictionary selected from the plurality of image-patches.

In another embodiment, a system for image-inpainting is provided. The method includes one or more memories and one or more hardware processors. The one or more memories are coupled to the one or more hardware processors, wherein the one or more hardware processors are capable of executing programmed instructions stored in the one or more memories to align a plurality of multi-view images of a scene with respect to a reference image to obtain a plurality of aligned multi-view ages. Further the one or more hardware processors execute the programmed instructions to select ROI in the reference image. The ROI represents a region to be removed from the reference image for image inpainting. Selecting the ROI in the reference image configures a hole to be filled in the reference image. Furthermore, the one or more hardware processors execute the programmed instructions to compute a priority value of each of a plurality of pixels of the ROI. The priority value of a pixel of the plurality of pixels is computed based on a product of a confidence term and a data term, where the confidence term measures an amount of reliable information surrounding the pixel and the data term encouraging synthesis of a linear combination of image-patches based on the priority value. Moreover, the one or more hardware processors execute the programmed instructions to create a dictionary comprising a plurality of image-patches selected from the reference image and the plurality of aligned multi-view images, and image patches obtained by 3-Dimensional (3D) rotation of image-patches selected from the reference image and the plurality of aligned multi-view images. Also, the one or more hardware processors execute the programmed instructions to systematically reconstruct the ROI in the reference image based at least on the priority values of the plurality of pixels and the dictionary by computing a linear combination of two or more image-patches of the dictionary selected from the plurality of image-patches In yet another embodiment, a non-transitory computer readable medium having embodied thereon a computer program for executing a method for image inpainting is provided. The method includes aligning a plurality of multi-view images of a scene with respect to a reference image to obtain a plurality of aligned multi-view images. Further the method includes selecting, via the one or more hardware processors, a region of interest (ROI) in the reference image. The ROI represents a region to be removed from the reference image for image inpainting. Selecting the ROI in the reference image configures a hole to be filled in the reference image. Furthermore, the method includes computing a priority value of each of a plurality of pixels of the ROI. The priority value of a pixel of the plurality of pixels s computed based on a product of a confidence term and a data term, where the confidence term measures an amount of reliable information surrounding the pixel and the data term encouraging synthesis of a linear combination of image-patches based on the priority value. Moreover, the method includes creating a dictionary comprising a plurality of image-patches selected from the reference image and the plurality of aligned multi-view images, and image patches obtained by 3-Dimensional (3D) rotation of image-patches selected from the reference image and the plurality of aligned multi-view images. Also, the method includes systematically reconstructing the ROI in the reference image based at least on the priority values of the plurality of pixels and the dictionary by computing a linear combination of two or more image-patches of the dictionary selected from the plurality of image-patches.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 3A and 3B illustrates illustrate multi-view images of a scene in accordance with some embodiments of the present disclosure.

FIG. 3C illustrates an aligned image associated with the multi-view images of FIGS. 3A and 3B in accordance with some embodiments of the present disclosure.

DETAILED DESCRIPTION

Figure 1:
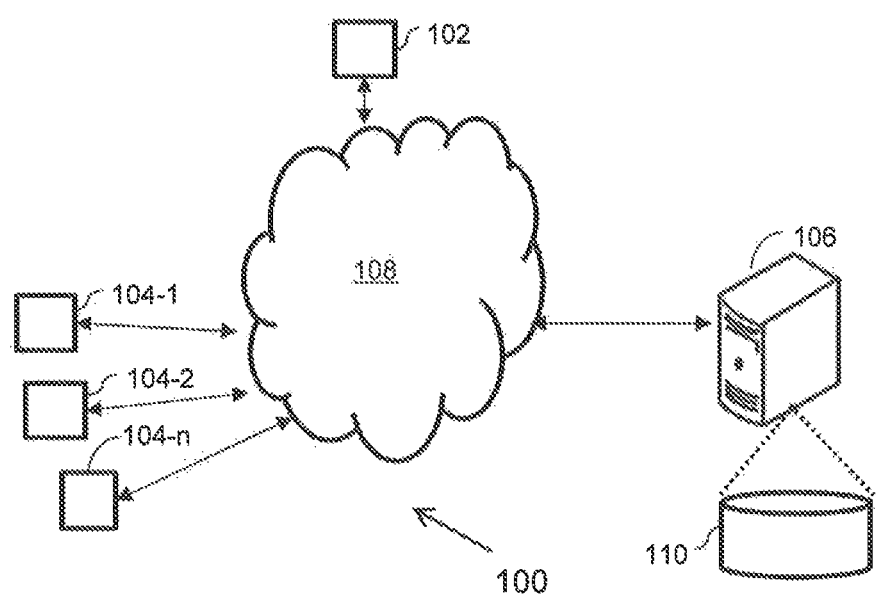
FIG. 1 illustrates an exemplary image inpainting system according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In recent years, the amount of data that is shared publicly, either by self or by various applications such as Google™ street view, has increased manifold. Such images may include private information, for instance, a car at an undesired location, number plate of the car, and so on. Object removal followed by inpainting can help maintain privacy while preserving the image aesthetic quality.

The object removal and inpainting, when performed on a single image may not reproduce quality images. Multiview images or multiple views of a scene allow utilization of occlusions to fill missing information, since information occulated in one of the views may be presented properly in another view of the same scene. However, significant differences in the viewing angle can lead to occurrence of artifacts when occluded pixels are directly copied across multiple views. Hence, in order to generate quality images upon inpainting, depth information has to be accounted and compensated for. Unfortunately, it may not always be feasible to obtain a dense depth map of a scene captured in the image.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates a network implementation 100 of a system 102 for image inpainting, in accordance with an example embodiment. The system 102 may be configured to remove portions having objects from the multi-view images of a scene, and inpainting said portions with sparse representations. In one aspect, the system 102 proposes method for a patch-based image-inpainting for multi-view images. The system 102 enables filling portions or holes in the multi-view images which are created by removing objects. Said portions of the images which are created by removing an object may be termed as region of interest (ROI) since the system 200 is configured to fill the holes formed in said regions due to removal of the object. In accordance, the terms 'hole', 'region of interest', and 'target region' refers to the regions or portion of the images that are formed upon removal of the object from the images, and hence will be used interchangeably throughout the description.

In order to remove an image portion having the object from the image, the system 102 initially aligns the pair of the images and constructs an exemplar dictionary having image-patches sampled from the reference image as well as the aligned/warped image(s). Subsequently, the system 102 iteratively fills the reference image by selecting patches along the boundary of the hole in the reference image. Said patches are selected by obtaining a plurality of patch solutions (meaning thereby, potential patches) corresponding to each pixel of the ROI, and identifying optimal patches therefrom to inpaint the ROI pixels. In an embodiment, the system 102 utilizes $I_1$-minimization framework to estimate the unknown pixels in the target region (or the hole).

The system 102 provides an image registration based approach, where an exemplar basis of an image is complemented by additional exemplars or image-patches sampled from an "aligned" views of the image. The "aligned" views are obtained from the multi-view images. Furthermore, in order to compensate for imperfections in registration, the system 102 utilizes a sparse reconstruction framework, which allows for linear combinations of the exemplars or the image-patches to be used for hole-filling, thereby providing an enhanced performance over conventional sparse reconstruction system.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, a cloud-based computing environment and the like. It will be understood that the system 102 may be accessed by multiple users through one or more user devices 104-1, 104-2 . . . 104-N, collectively referred to as user devices 104 hereinafter, or applications residing on the user devices 104. In one implementation, the system 102 may include a cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internee, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
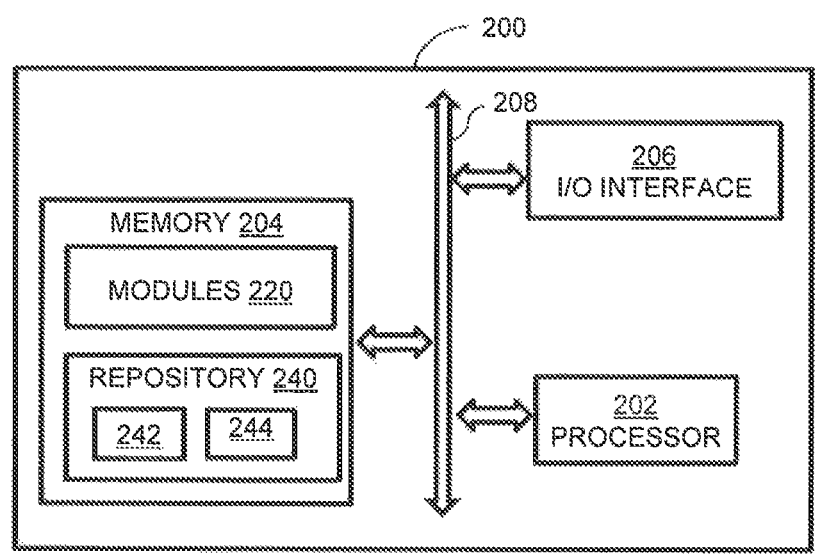
FIG. 2 is a functional block diagram according to some embodiments of the present disclosure.

FIG. 2 illustrates a block diagram of a system 200 for image inpainting, in accordance with an example embodiment. The system 200 may be an example of the system 102 (FIG. 1). In an example embodiment, the system 200 may be embodied in, or is in direct communication with the system, for example the system 102 (FIG. 1). The system 200 includes or is otherwise in communication with at least one processor such as a processor 202, at least one memory such as a memory 204, and an I/O interface 206. The processor 202, memory 204, and the I/O interface 206 may be coupled by a system bus such as a system bus 208 or a similar mechanism.

The I/O interface 206 may include a variety of software and hardware interfaces, for example, a web interface, a graphical user interface, and the like The interfaces 206 may include a variety of software and hardware interfaces, for example, interfaces for peripheral device(s), such as a keyboard, a mouse, an external memory, a camera device, and a printer. Further, the interfaces 206 may enable the system 102 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The hardware processor 202 may be implemented as one or more microprocessors, microcomputers, microcontrollers, digital signal processors, central processing units, state machines, logic circuitries, and/or any devices that manipulate signals based on operational instructions. Among other capabilities, the hardware processor 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220. The modules 220 may include routines, programs, objects, components, data structures, and so on, which perform particular tasks or implement particular abstract data types. In one implementation, the modules 220 may include programs or coded instructions that supplement applications and functions of the system 200.

The repository 240, amongst other things, includes a system database 242 and other data 244. The other data 244 may include data generated as a result of the execution of one or more modules 220.

In one implementation, at first, a user may use the client devices 104 to access the system 102 via the I/O interface 204. The user may register them using the I/O interface 204 in order to use the system 102. In one aspect, the user may accesses the I/O interface 204 of the system 102 for removing an object, from a multi-view image, by inpainting the multi-view image with sparse representations. The embodiments herein facilitate to fill in the holes, created by removing an object from the multi-view images. In order to remove the object, initially, the plurality of multi-view images may be accessed. In an embodiment, the plurality of multi-view images may include an image pair of a scene. It will be noted that herein for the brevity of description, the plurality of multi-view images is considered to include two images of the scene. In alternate embodiments, the plurality of multi-view images may include more than two images of the scene.

The image pair may include the images of a scene captured from different viewing angles. For example, an image '$i_1$' may correspond to a view V1 of the scene while an image '$i_2$' may correspond to a view V2 of the scene. In one embodiment, the system 102 broadly categorizes the methodology, for removing from the multi-view image, into four stages i.e. a mask definition, an image registration, an order of inpainting and an image inpainting using sparse representations which are described below in detail.

The system 200 may be caused to receive a selection of the region of interest (ROI) in an image of the plurality of multi-view images, for example, the images '$i_1$' and '$i_2$' associated with the scene. It will be noted that the selection of the object may be done in any one image of the plurality of images. In an embodiment, the object selected in the image may be determined, for example by a user. Alternatively, the object may be selected automatically based on predetermined criteria. Additionally or alternative, the object may be selected in one of the images; the system may be auto-configured to identify and select the object other multi-view images of the scene. Selecting the ROI in the plurality of multi-view images creates a hole to be filled in the plurality of multi-view images.

Herein, the selection of the object in the multi-images may define a boundary image encircling the object. Such a boundary image may be termed as a 'mask'. In an implementation, the definition of mask such as masks '$M_1$' and '$M_2$' facilitates to specify the region (containing the object) to be removed from the images '$i_1$' and '$i_2$' respectively. It may be understood that after removing the object from the multi-view images '$i_1$' and said images and '$i_2$' and '$i_2$' are referred to as first image '$I_1$' and second image '$I_2$' respectively. It may be further understood that the regions/portion having the object and removed by $M_1$ and $M_2$ in '$I_1$' and '$I_2$' respectively are referred to as a target region, hereinafter indicated as '$\Omega_1$' and '$\Omega_2$', respectively. The remaining images portions in the images '$I_1$' and '$I_2$', on the other hand, are indicated as a source region hereinafter referred to as '$\varphi_1$' and '$\varphi_2$' respectively. In one aspect, intersection of the target region and the source region may form a boundary of the target region and the source region. The boundary of the target region and the source region in the first image and the second image may be represented as '$\Omega_1\varphi_1$' and '$\Omega_2\varphi_2$'. An example illustrating the target region, source region and the boundary regions for an image pair are described further with reference to FIGS. 3A-3C.

Upon selecting the ROI in the reference image, the system 200 is caused to label a plurality of pixels of the ROI. Herein, labelling the pixels of the ROI may refer to assigning a label or an identifier to each of the pixels so as to differentiate the pixels from each other. For example, the system 200 may assign labels such as 1, 2, 3, . . . N to the plurality of pixels on the boundary of the ROI.

The system 200 may be caused to align the plurality of multi-view images with respect to at least one reference image selected from the plurality of images to obtain a plurality of aligned multi-view images. The aligning of the images with respect to an image is referred to as image registration or image warping. For example, the image '$I_1$' may be registered or aligned with respect to the image '$I_2$'.

In one embodiment, for registering the images '$I_1$' and '$I_2$', corners pertaining to '$I_1$' and '$I_2$' may be detected. In an embodiment, the corners of the images '$I_1$' and '$I_2$' may be detected by using a corner detection technique, such as Harris corner detection technique. In an embodiment, for each corner in '$I_1$' corresponding match in '$I_2$' may be calculated by using a Normalized Cross Correlation (NCC) technique. After computing the NCC, each point in '$I_1$' has a corresponding match in '$I_2$', but these putative corresponding matches sometimes may not be perfect, and may be referred to as outliers. The outliers may be removed by a Random Sample Consensus (RANSAC) algorithm. Based on the putative points, the RANSAC algorithm may compute a Homography matrix 'H'. Once the Homography matrix 'H' is estimated, the system 200 may warp the image '$H_1$' and the image '$I_2$' as $$\begin{bmatrix} I'_1 \\ 1 \end{bmatrix} = H^{-1} \begin{bmatrix} I_1 \\ 1 \end{bmatrix} \text{ and} \quad (1)$$

$$\begin{bmatrix} I'_2 \\ 1 \end{bmatrix} = H \begin{bmatrix} I_2 \\ 1 \end{bmatrix}$$

where '$I_1$' and '$I_2$' are warped images aligned with '$I_1$' and '$I_2$' respectively. An example of the warped image '$I_2$' aligned with respect to $I_1$ is described with reference to FIG. 3C.

In another embodiment, the system 200 may perform warping or image registration on the image pair without mask. For example, the system 200 may estimate the Homography matrix 'H' (as explained above), and using said Homography matrix 'H', the system 200 may align the images and the mask '$M_1$' based on the following equation:

$$\begin{bmatrix} M'_1 \\ 1 \end{bmatrix} = H^{-1} \begin{bmatrix} M_1 \\ 1 \end{bmatrix} \quad (2)$$

where '$M_1$' is used as mask for view $V_2$ which results in '$I_2$'.

In yet another embodiment, instead of detecting the corners in '$I_1$' and '$I_2$', the system 200 may receive a user input of points around the mask. For each of the points provided as user input in '$I_1$', the system 200 may calculate a corresponding match in '$I_2$' by using, for example, the NCC technique. Subsequently, the RANSAC algorithm may be used to estimate the Nomography matrix 'H'.

The system 200 is caused to form a dictionary using the patches of the reference image as well as the patches from the aligned images. Also, the system 200 may augment the 3D rotations of the patches from the reference image and the aligned images to populate the dictionary. The patches selected from the reference image, the aligned images and the 3D rotations of such selected patches may collectively be termed as 'plurality of patches' original dictionary.

Upon marking the ROI in the reference image and aligning the images with respect to the reference image, the system 200 is caused to determine solutions for each of a plurality of pixels of the ROI, as well as an order of inpainting the plurality of pixels. Herein, the solutions corresponding to each of the plurality of pixels refers to the n patches that may be utilized for estimating the value of the pixel. Accordingly, determining the solutions corresponding to a pixel refers to estimating n patches from the dictionary. An example implementation of estimating n patches systematically for inpainting of the ROI is described below.

In an embodiment, the system 200 computes a priority value of a plurality of pixels located at a boundary of the ROI in the reference image. In an embodiment, the priority value of a pixel of the plurality of pixels is computed based on a product of a confidence term and a data term, such that the confidence term measures an amount of reliable information surrounding the pixel and the data term encourages synthesis of a linear combination of image-patches based on the priority value.

The system 200 is caused to automatically create a dictionary having a plurality of image-patches. The plurality of image-patches are to be utilized to fill the holes (or for image inpainting). Herein, it will be noted that the dictionary is created by estimating image-patches from the multi-view images and 3D rotated image-patches associated with image-patches estimated from the multi-view images. The set of image-patches is estimated by estimating image-patches from the reference image as well as from the aligned multi-images. In addition, the set of image-patches may include image-patches obtained by three dimensional (3D) rotations of the image-patches obtained from the multi-view images and the reference image. Herein, it will be noted that due to inclusion of the image patches obtained by the 3D rotations facilitates in increasing the size of the dictionary. The system 200 utilizes the dictionary having the plurality of image-patches to reconstruct the ROI in the reference image.

The system 200 is caused to systematically reconstruct the ROI in the reference image based at least on the dictionary. In an embodiment, in order to systematically reconstruct the ROI, the system 200 computes a linear combination of two or more image-patches selected from the plurality of image-patches contained in the dictionary. In an embodiment, systematically reconstructing the ROI in the reference image includes iteratively growing the ROI from a boundary of the hole towards inside of the hole to estimate unknown pixels of the ROI in reference image. Herein, iteratively growing the ROI includes obtaining multiple patch-solutions (meaning potential patches) for each pixel of the ROI, forming a Trellis therefrom, and then decoding the Trellis to obtain an optimal selection of patches for each of the pixel. The optimal solution can be obtained by forming a shortest path from the Trellis. The selection of patches from Trellis provides the image-patches corresponding to the pixels of the ROI. Said image-patches can be utilized for image inpainting.

To iteratively grow the ROI, the system 200 initially selects a pixel on the boundary of the ROI in the first image based on a priority value associated with the pixel, and then selects multiple patches of predefined size containing the pixel. Herein, it will be noted that the multiple patches are selected in a manner that such patches includes only one pixel which is unknown.

The inpaiting of the pixels of the ROI is performed in a defined order, such an order is hereinafter referred to as order of inpaiting. The order of inpainting is obtained based on a determination of the highest priority pixel at each iteration. In one aspect, the order of inpainting refers to order of selecting the pixels of the target region (ROI) in the reference image '$I_1$' for inpainting by considering the plurality of patches from the dictionary. In one aspect, the image inpainting may be performed pixel by pixel. In order to inpaint the target region in the reference image, the system 102 iteratively grows the ROI from the boundary of the hole towards inside.

In each iteration, the system 200 calculates priorities of all pixels along the boundary '$\Omega_1$''$\varphi_1$' of the ROI and the pixel with maximum priority is selected as the first pixel $p^l$. In one aspect, the priority of the pixel is product of a confidence term, which measures the amount of reliable information surrounding the pixels and a data term that encourages linear structures to be synthesized first.

It will be noted that each pixel of the ROI may be contained in multiple patches in the reference image. The system 200 is caused to select the patch which has minimum reconstruction error. Using the patch with minimum reconstruction error, the process of obtaining multiple patch-solutions by reducing the dictionary iteratively. An implementation for determining priorities and the order of inpainting is described below.

The system 200 removes pixel components having indices in the ROI of the reference image to obtain a vector containing the faithful values in surroundings of the ROI. The system 200 further removes the indices of ROI from the dictionary patches to obtain a reduced dictionary, and estimates sparse coefficients of the dictionary patches using $l_1$-minimization method. The system 200 then estimates a full sized patch by computing a linear combination of sparse coefficients and dictionary patches. Further, the system may create a stack of estimated patches by reducing the patch from dictionary that has dominating sparse coefficients and re-estimates the patch again using the reduced dictionary. Alternatively, the system 200 may create the stack using image-patches having highest sparse coefficient. Herein, the dominating sparse coefficients are computed that have energy greater than or equal to a predefined threshold. The system 200 repeats this procedure for several times and stores the estimated patches in a stack. The system 200 then modifies the priority of pixels at the ROI boundary by aggregating the priorities of pixel at the ROI boundary obtained using stacked patches. Then system 200 estimates an optimal patch from the stack of patches for in-painting by replacing the ROI patch values with the values of the optimal estimated patch. Once the patch is in-painted the above process is repeated according to the updated pixel priorities. Based on the above description, an algorithm defined for image inpainting from the multi-view image is defined below:

In an iteration, firstly, the dictionary D is copied to $\tilde{D}$ and the solution iterations is initiated to zero. Then, the system 200 selects the patches for example, K patches $Y = y_1^l, \ldots, y_k^l$ that contains the highest priority pixel of ROI. In the first iteration, the selected patches do not contains the pixels that has been processed earlier, however, in subsequent iterations the patches may contains the pixels that has been processed earlier, in that case such pixels can be replaced using their estimates from B. Given the K possible patches for given highest priority ROI pixel $p^l$, a most likely patch can be selected from amongst such patches, by the system 200, in a manner defined below:

a. Compute sparse coefficients, $\hat{\beta}_k$ for each patch $y_k^l$.

$$\hat{\beta}_k = \underset{\beta}{\mathrm{argmin}} \|y_k^l - D'\beta\|_2^2 + \lambda\|\beta\|_1$$

b. Using the sparse coefficients, estimate each patch, $\hat{y}_k^l$.

$$\hat{y}_k^l = D'\hat{\beta}_k$$

c. Select the patch that has minimum reconstruction error i.e.

$$y^l = \underset{y}{\mathrm{argmin}} \|y_k^l - \hat{y}_k^l\|_2^2$$

d. Herein, it is to be noted that D' (updated dictionary) is used which is obtained after removing a pixel from each dictionary patch at an index equal to the index of missing pixel in ROI patch $y_k^l$.

Once a best patch (meaning thereby, the patch associated with minimum reconstruction error) is found, using such a patch, iteratively the N possible patches can be determined by the system 200, by following as below:

a. Estimate the sparse solution to estimate $\hat{\beta}_i^l$ to estimate $i^{th}$ patch where $i \subset [0, N-1]$ $$\hat{\beta}_i^l = \underset{\beta}{\mathrm{argmin}} \|y^l - \tilde{D}'\beta\|_2^2 + \lambda\|\beta\|_1$$

b. The $i^{th}$ patch solution is estimated using full sized dictionary $\tilde{D}$ and sparse solution $\hat{\beta}_i^l$ as $\hat{y}_i^l = \tilde{D}\hat{\beta}_i^l$.

c. Update dictionary: It reduces the size of dictionary by removing the dominating dictionary patches whose coefficients contributes x % of total energy. The energy of coefficients $\beta$ is computed as: $E_\beta = \Sigma_{i=0}^M \beta^2$ where $M = \|\beta\|_0$.

d. Repeat the above procedure to obtain N solution patches.

After obtaining the N patch solutions for given ROI pixel, $p^l$, the system 200 estimates pixel value by using N patch solutions as follows:

a. The system estimates the sparse coefficient solution vector using $$\hat{\gamma}^l = \underset{\gamma}{\mathrm{argmin}} \left( \sum_{i=1}^N \alpha_i \|\hat{y}_i^l - D\gamma\|_2^2 \right) + \lambda\|\gamma\|_1$$

b. Next, the system estimates the patch using sparse solution: $\hat{y}^l = D\hat{\gamma}^l$ c. Thereafter the system obtains the estimated pixel value from $\hat{y}^l$ at the index of missing ROI pixel, and stores the estimated pixel value in B. In addition, store the label 1 of the pixel $p^l$ in 0, where O represents order of inpainting.

To obtain the new or updated priorities of pixels, the missing ROI pixels can be inpainted using their estimates, B and again the updated priority values for each of the remaining boundary pixels is estimated. The entire process of obtaining updated priorities in each iteration, and inpainting based on the updated priorities is repeated until the plurality of pixels are processed. At the end of the iterative process, N solution patches $\{\hat{y}_0^l, \ldots, \hat{y}_{N-1}^l\}$ for each of the plurality of pixels of the ROI and their processed order 0 are derived. Using the N solution patches and their processed order 0, the system forms a trellis which is used for inpainting as follows.

In an aspect, the system follows the below mentioned steps for Trellis Formation:
  a. The nodes in the trellis indicate the patch along with the order e.g. $\hat{y}_1^{0j}$ indicate the patch of solution number 1 and it has been processed at number $0_j \epsilon 0$.
  b. An edge weight of trellis is defined as $e_{l,m}^{i,j}$, where $$e_{l,m}^{i,j} = \|\hat{y}_l^i - \hat{y}_m^j\|_2^2$$

c. From the trellis, the patch sequence, Y, resulting minimum path cost is selected in inpainting the pixels. The respective pixels are selected from the patches to replace the ROI pixels.

Thus, in this manner, the system 200 removes the object, from the multi-view image, by inpainting the multi-view image with the sparse representations. Although implementations for methods and systems for image inpainting have been described in language specific to structural features and/or methods, it is to be understood that the disclosure is not necessarily limited to the specific features or methods described. Rather, the specific features and methods are disclosed as examples of implementations for image inpainting.

Referring to FIGS. 3A-3C, '$I_1$' is the image in view-1, in FIG. 3A and is the reference image. In FIG. 3B, '$I_2$' is the image in an alternate view, for example view-2. In FIG. 3C, '$\tilde{I}_2$' the warped image obtained by aligning '$I_2$' with '$I_1$'. In the images, '$\varphi$' is the source region, '$\Omega$' is the target region and 'y' is the patch to be filled.

Figure 4:
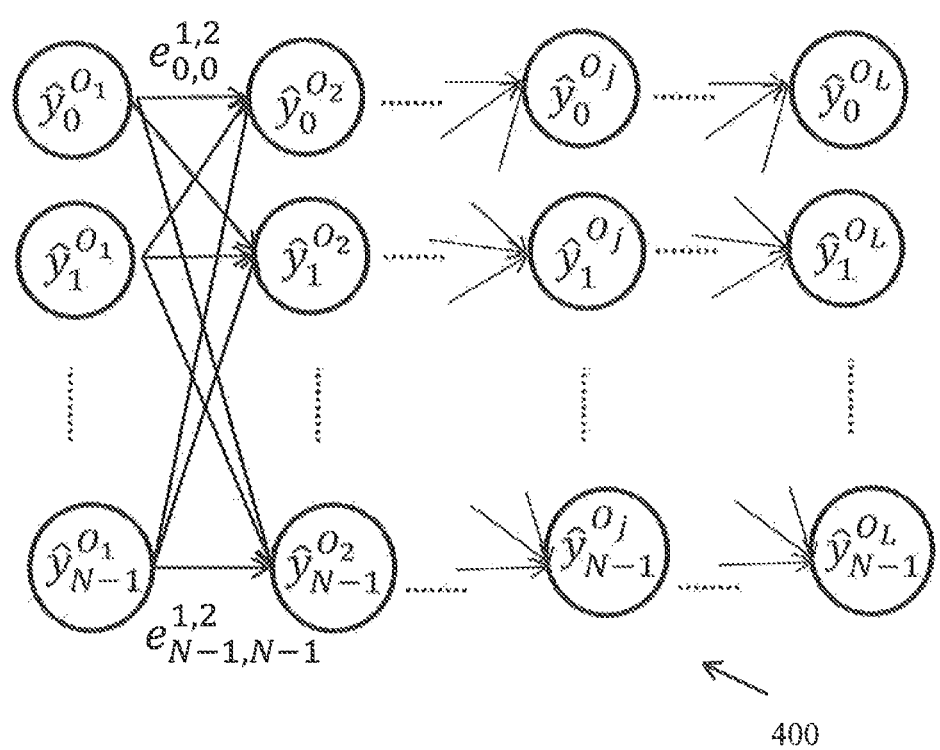
FIG. 4 illustrates an example representation of trellis or image inpainting according to some embodiments of the present disclosure.

FIG. 4 illustrates example representation of trellis 400 for image inpainting, in accordance with an example embodiment. The trellis 400 includes multiple patch-solutions (for example, N patch-solutions) for each pixel in the ROI. For example, as illustrated in FIG. 4, the trellis 400 includes a plurality of nodes and a plurality edges connecting the plurality of nodes. The nodes in the trellis indicate the image-patches (or patch-solutions) along with their respective order. For example, $\hat{y}_1^{0j}$ indicates the patch of patch-solution number 1 and it has been processed at order number $0_j \epsilon 0$.

In trellis, an edge weight of trellis is defined as $e_{l,m}^{i,j}$, where $$e_{l,m}^{i,j} = \|\hat{y}_l^i - \hat{y}_m^j\|_2^2$$

Various nodes as well as edge weights between the nodes are indicated in the trellis 400 of FIG. 4.

From the trellis 400, a patch sequence, Y, resulting minimum path cost is selected for inpainting the pixels. The respective pixels are selected from the patches to replace the ROI pixels. In an implementation, dynamic programming (for example, Viterbi decoding) can be used to determine the optimal patch sequence from the trellis 400. Once the optimal patch from the multiple patch-solutions is obtained for each pixel in ROI, the system may inpaint said pixels of the ROI.

Figure 5:
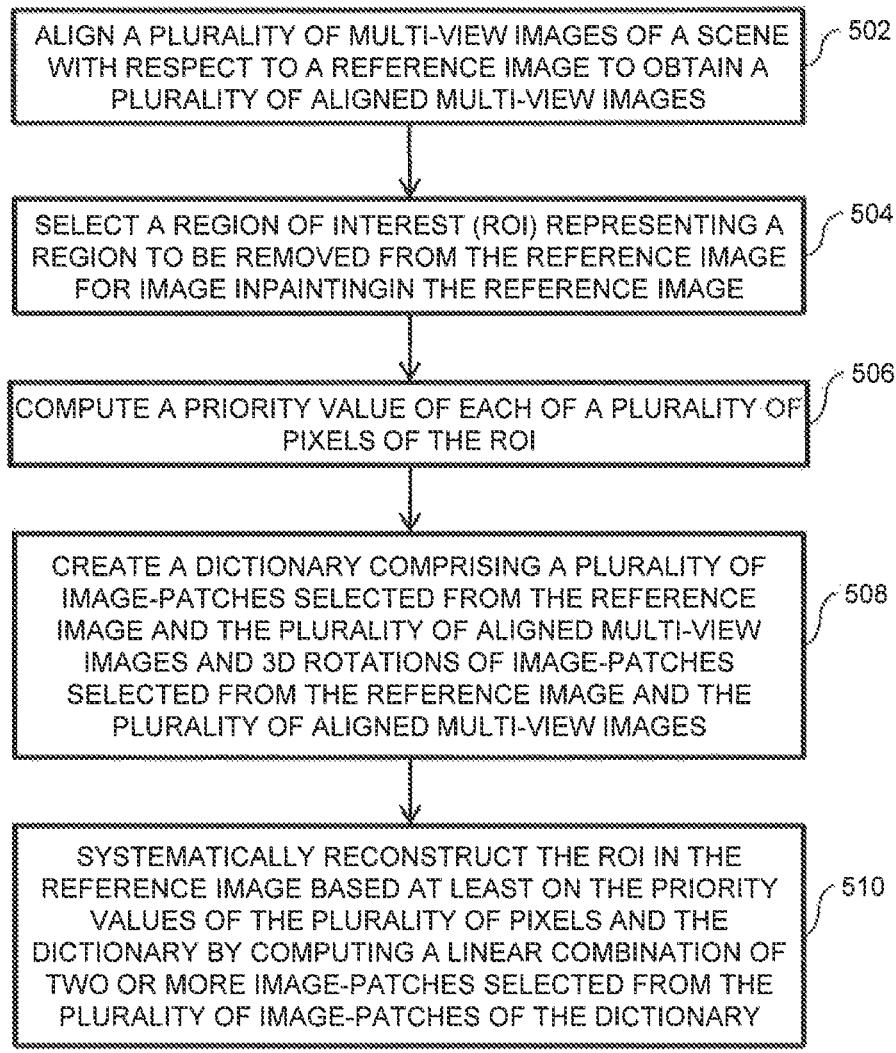
FIG. 5 is a flow diagram illustrating a method for image inpainting in accordance with some embodiments of the present disclosure.

FIG. 5 illustrates a flow diagram of a method 500 for image inpainting, in accordance with an example embodiment. The method 500 may be described in the general context of computer executable instructions. Generally, computer executable instructions can include routines, programs, objects, components, data structure procedures, modules, functions, etc., that perform particular functions or implement particular abstract data types. The method 500 may also be practiced in a distributed computing environment where functions are performed by remote processing devices that are linked through a communication network. The order in which the method 500 is described is not intended to be construed as a limitation, and any number of the described method blocks can be combined in any order to implement the method 500, or are alternative method. Furthermore, the method 400 can be implemented in any suitable hardware, software, firmware, or combination thereof. In an embodiment, the method 500 depicted in the flow chart may be executed by a system, for example, the system 200 of FIG. 2. In an example embodiment, the system 200 may be embodied in a computing device, for example, the computing device 104 (FIG. 1).

At 502, the method 500 includes aligning a plurality of multi-view images of a scene with respect to a reference image to obtain a plurality of aligned multi-view images. In an embodiment, aligning an image of the plurality of multi-view images with respect to the reference image includes detecting corners of the image and the reference image using a corner detector. Corresponding to each corner in the image, a matching corner in the reference image is computed by using a NCC method. Further, a homography matrix H is estimated based on the computing of the matching corner in the reference image. The image is warped based on the reference image and the homography matrix H. An example illustrating warping of the image with respect to the reference image is illustrated with reference to FIGS. 3A-3C, At 504, the method 500 includes selecting a ROI in the reference image. The ROI represents a region to be removed from the reference image for image inpainting such that selection of the ROI in the reference image configures/creates a hole to be filled in the reference image. It will noted that the selection of the ROI can be done manually or automatically. For instance, for automatic selection of the ROI the system may be caused to identify certain objects, and be caused to remove the identified objects from the plurality of images.

At 506, the method 500 includes computing a priority value of each of a plurality of pixels of the ROI. Herein, the priority value of a pixel of the plurality of pixels is computed based on a product of a confidence term and a data term. The confidence term measures an amount of reliable information surrounding the pixel. Also, the data term encourages synthesis of a linear combination of image-patches based on the priority value.

At 508, the method 500 includes creating a dictionary including a plurality of image-patches selected from the reference image and the plurality of aligned multi-view images. Additionally, the dictionary includes image-patches that are 3D variants of the image-patches selected from the reference image and the aligned multi-view images.

At 510, the method 500 includes systematically reconstructing the ROI in the reference image based at least on the dictionary. In order to reconstruct the ROI in the reference image, pixel values of and an order of inpainting of the plurality of pixels of the ROI are estimated. Herein, the order of inpainting includes an order of selecting pixels from amongst the plurality of pixels for inpainting.

In an embodiment, the pixel values of the plurality of pixels are iteratively estimated, and upon estimation of the pixel value of a pixel, the priority values of the remaining pixels are recomputed/redefined. Using the redefined pixel values, again the pixel value and order of inpainting are determined for the pixels that may be remaining for inpainting, and the method goes on until the pixel values and order of inpainting of the plurality of pixels are determined which is referred to as the first pixel.

In one aspect, the process of inpainting of the plurality of pixels is explained by using one pixel, which is referred to as a first pixel. For estimating the pixel value, the first pixel is selected on a boundary of the ROI in the reference image associated based on the priority value of the pixel. The first pixel is associated with a highest priority value. A set of image-patches having the first pixel is selected. Here, the set of image-patches includes only the first pixel with unknown pixel value. The set of image-patches are iteratively reconstructed to obtain a set of reconstructed image-patches.

In an embodiment, iteratively reconstructing the image patches includes computing sparse coefficients for each image-patch of the set of image-patches, and estimating each image-patch using the sparse coefficients to obtain the set of reconstructed image-patches. Herein, reconstructing an image-patch of the set of image-patches is associated with a reconstruction error. Herein, 'reconstruction error' may be defined as a deviation from an original image, upon reconstruction of a portion of the image. The reconstruction error may be computed as square of absolute of difference between the original image-patch and the reconstructed image-patch. In an implementation, an image-patch is selected from the set of reconstructed image-patches associated with minimum reconstruction error. A image-patch solution is constructed based on the image-patch associated with minimum reconstruction error. The dictionary is updated by removing one or more dominant image-patches from the dictionary having a predefined percentage of energy coefficient to obtain an updated dictionary. Subsequently, the image-patches solutions are computed and the dictionary is updated iteratively until a predefined number of image-patch solutions are obtained. The image-patches solutions are estimated using the sparse linear combination of dictionary patches at each iteration.

The sparse coefficients are estimated using $l_1$-minimization. In one implementation, the sparse coefficients are estimated using the below mentioned equation:

$$\hat{\gamma}^l = \underset{\gamma}{\operatorname{argmin}}\left(\sum_{i=1}^{N} \alpha_i \|\hat{y}_i^l - D\gamma\|_2^2\right) + \lambda\|\gamma\|_1$$

where $\gamma^l$ is the sparse coefficients, $\alpha_i$ are weights

Further, the image-patch is estimated using sparse solution $\hat{y}^l = D\hat{\gamma}^l$.

An estimated pixel value is obtained from the sparse solution at an index of the first pixel. In an embodiment, upon estimating the pixel value of the first pixel, the priority values of remaining pixels of the plurality of pixels of the ROI are redefined to obtain redefined priority values associated with the remaining pixels. Further, the pixel values and the order of inpainting of the remaining pixels of the plurality of pixels of the ROI are estimated for systematically reconstructing the ROI based at least on the redefined pixel values. Using the estimated pixel values and an order of inpainting of the estimated pixels, the first pixel is inpainted by using trellis formation, as discussed with reference to FIG. 4

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Exemplary embodiments discussed above may provide certain advantages. Though not required to practice aspects of the disclosure, these advantages may include those provided by the following features, The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of image inpainting in an efficient manner. For example, the embodiments disclosed herein provide image inpaiting in a manner such that the artifacts that are typically encountered in the inpainted images are precluded. In addition, the disclosed embodiments utilize multiview images for constructing a dictionary of image patches that can be utilized for filling the hole created in the image by removing the object from the image. Using patches from Multiview images as well as 3D variants of such patches populated the dictionary with a huge data set of image-patches, thereby providing a huge database of image information that can be utilized for inpainting the image. A significant contribution of the embodiment disclosed herein is that the dictionary is also updated, meaning thereby, the dictionary is initially populated with lot of relevant information, and thereafter reduced by selecting the information that would be useful for an iteration of image inpainting.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for image inpainting, comprising:
    aligning, via one or more hardware processors, a plurality of multi-view images of a scene with respect to a reference image to obtain a plurality of aligned multi-view images;
    selecting, via the one or more hardware processors, a region of interest (ROI) in the reference image, the ROI representing a region to be removed from the reference image for image inpainting, selecting the ROI in the reference image configuring a hole to be filled in the reference image;
    computing, via the one or more hardware processors, priority values associated with a plurality of pixels of the ROI, the priority value of a pixel of the plurality of pixels computed based on a product of a confidence term and a data term, the confidence term measuring an amount of reliable information surrounding the pixel and the data term encouraging synthesis of a linear combination of image-patches based on the priority value;
    creating, via the one or more hardware processors, a dictionary comprising a plurality of image-patches selected from the reference image, the plurality of aligned multi-view images, and image patches obtained by 3-Dimensional (3D) rotation of image-patches selected from the reference image and the plurality of aligned multi-view images; and
    systematically reconstructing, via the one or more hardware processors, the ROI in the reference image based at least on the priority values associated with the plurality of pixels and the dictionary by computing a linear combination of two or more image-patches selected from the plurality of image-patches of the dictionary.

2. The method of claim 1, wherein aligning an image of the plurality of multi-view images with respect to the reference image comprises:
    detecting a plurality of corners of the image and the reference image using a corner detector;
    computing, corresponding to each corner of the plurality of corners in the image, a matching corner in the reference image by using a Normalized Cross Correlation (NCC) method;
    estimating a homography matrix H based on the computing of the matching corner in the reference image; and
    warping the image with respect to the reference image based on the homography matrix.

3. The method of claim 1, further comprising iteratively estimating pixel values and an order of inpainting of the plurality of pixels of the ROI for systematically reconstructing the ROI, wherein the order of inpainting comprises an order of selecting pixels from amongst the plurality of pixels for inpainting.

4. The method of claim 3, wherein estimating a pixel value of a first pixel of the plurality of pixels comprises:
    selecting the first pixel on a boundary of the ROI in the reference image associated with a highest priority value;
    selecting a set of image-patches comprising the first pixel, wherein the set of image-patches comprises only the first pixel with unknown pixel value;
    iteratively reconstructing the set of image-patches to obtain a set of reconstructed image-patches, wherein reconstructing an image-patch of the set of image-patches is associated with a reconstruction error;
    selecting an image-patch from the set of reconstructed image-patches associated with minimum reconstruction error;
    computing an image-patch solution based on the image-patch associated with the minimum reconstruction error;
    updating the dictionary by removing one or more dominant image-patches from the dictionary having a predefined percentage of energy coefficient to obtain an updated dictionary; and
    iteratively performing computing subsequent image-patch solutions and subsequent updating the updated dictionary until a predefined number of image-patch solutions are obtained;
    estimating pixel-value of the first pixel based on equation:

$$\hat{\gamma}^l = \underset{\gamma}{\operatorname{argmin}} \left( \sum_{i=1}^{N} \alpha_i \|\hat{y}_i^l - D\gamma\|_2^2 \right) + \lambda \|\gamma\|_1$$

where $\gamma^l$ are the sparse coefficients, $\alpha_i$ represents weights, l is index of the first pixel;
    estimating the image-patch using sparse solution $\hat{y}^l = D\hat{\gamma}^l$; and
    obtaining an estimated pixel value from the sparse solution at an index of the first pixel.

5. The method of claim 4, wherein iteratively reconstructing the image-patches comprises:
    computing sparse coefficients for each image-patch of the set of image-patches; and
    estimating each image-patch using the sparse coefficients to obtain the set of reconstructed image-patches.

6. The method of claim 5, further comprising inpainting the first pixel using the estimated pixel value.

7. The method of claim 6, further comprising:
    redefining the priority values of remaining pixels of the plurality of pixels of the ROI to obtain redefined priority values associated with the remaining pixels; and
    estimating the pixel values and the order of inpainting of the remaining plurality of pixels of the ROI for systematically reconstructing the ROI based at least on the redefined pixel values.

8. A system for image inpainting, the system comprising: one or more memories; and
    one or more hardware processors, the one or more memories coupled to the one or more hardware processors, wherein the one or more hardware processors are capable of executing programmed instructions stored in the one or more memories to:
    align a plurality of multi-view images of a scene with respect to a reference image to obtain a plurality of aligned multi-view images;

select a region of interest (ROI) in the reference image, the ROI representing a region to be removed from the reference image for image inpainting, selecting the ROI in the reference image configuring a hole to be filled in the reference image;

compute priority values associated with a plurality of pixels of the ROI, the priority value of a pixel of the plurality of pixels computed based on a product of a confidence term and a data term, the confidence term measuring an amount of reliable information surrounding the pixel and the data term encouraging synthesis of a linear combination of image-patches based on the priority value;

create a dictionary comprising a plurality of image-patches selected from the reference image, the plurality of aligned multi-view images, and image patches obtained by 3-Dimensional (3D) rotation of image-patches selected from the reference image and the plurality of aligned multi-view images; and systematically reconstruct the ROI in the reference image based at least on the priority values associated with the plurality of pixels and the dictionary by computing a linear combination of two or more image-patches selected from the plurality of image-patches of the dictionary.

9. The system of claim 8, wherein to align an image of the plurality of multi-view images with respect to the reference image, the one or more hardware processors executes programmed instructions to:
detect a plurality of corners of the image and the reference image using a corner detector;
compute, corresponding to each corner of the plurality of corners in the image, a matching corner in the reference image by using a Normalized Cross Correlation (NCC) method;
estimate a homography matrix H based on the computing of the matching corner in the reference image; and
warp the image with respect to the reference image based on the homography matrix.

10. The system of claim 8, wherein the one or more hardware processors further executes programmed instructions to iteratively estimate pixel values and an order of inpainting of the plurality of pixels of the ROI for systematically reconstructing the ROI, wherein the order of inpainting comprises an order of selecting pixels from amongst the plurality of pixels for inpainting.

11. The system as claimed in claim 10, wherein to estimate a pixel value of a first pixel of the plurality of pixels, the one or more hardware processors executes programmed instructions to:
select the first pixel on a boundary of the ROI in the reference image associated with a highest priority value;
select a set of image-patches comprising the first pixel, wherein the set of image-patches comprises only the first pixel with unknown pixel value;
iteratively reconstruct the set of image-patches to obtain a set of reconstructed image-patches, wherein reconstructing an image-patch of the set of image-patches is associated with a reconstruction error;
select an image-patch from the set of reconstructed image-patches associated with minimum reconstruction error;
compute an image-patch solution based on the image-patch associated with the minimum reconstruction error;

updating the dictionary by removing one or more dominant image-patches from the dictionary having a predefined percentage of energy coefficient to obtain an updated dictionary; and
iteratively compute subsequent image-patch solutions and subsequently update the updated dictionary until a predefined number of image-patch solutions are obtained;
estimate pixel-value of the first pixel based on equation:

$$\hat{\gamma}^l = \underset{\gamma}{\operatorname{argmin}}\left(\sum_{i=1}^{N} \alpha_i \|\hat{y}_i^l - D\gamma\|_2^2\right) + \lambda\|\gamma\|_1$$

where $\gamma^l$ are the sparse coefficients, $\alpha_i$ represents weights, l is index of the first pixel;
estimate the image-patch using sparse solution $\hat{y}^l = D\hat{\gamma}^l$; and
obtain an estimated pixel value from the sparse solution at an index of the first pixel.

12. The system of claim 11, wherein to iteratively reconstruct the image-patches, the one or more hardware processors execute programmed instructions to:
compute sparse coefficients for each image-patch of the set of image-patches; and
estimate each image-patch using the sparse coefficients to obtain the set of reconstructed image-patches.

13. The system of claim 12, wherein the one or more hardware processors further executes programmed instructions to inpaint the first pixel using the estimated pixel value.

14. The system of claim 13, wherein the one or more hardware processors further executes programmed instructions to;
redefine the priority values of remaining pixels of the plurality of pixels of the ROI to obtain redefined priority values associated with the remaining pixels; and
estimate the pixel values and the order of inpainting of the remaining plurality of pixels of the ROI for systematically reconstructing the ROI based at least on the redefined pixel values.

15. A non-transitory computer-readable medium having embodied thereon a computer program for executing for image inpainting comprising, comprising:
aligning a plurality of multi-view images of a scene with respect to a reference image to obtain a plurality of aligned multi-view images;
selecting a region of interest (ROI) in the reference image, the ROI representing a region to be removed from the reference image for image inpainting, selecting the ROI in the reference image configuring a hole to be filled in the reference image;
computing priority values associated with a plurality of pixels of the ROI, the priority value of a pixel of the plurality of pixels computed based on a product of a confidence term and a data term, the confidence term measuring an amount of reliable information surrounding the pixel and the data term encouraging synthesis of a linear combination of image-patches based on the priority value;
creating a dictionary comprising a plurality of image-patches selected from the reference image, the plurality of aligned multi-view ages, and image patches obtained by 3-Dimensional (3D) rotation of image-patches selected from the reference image and the plurality of aligned multi-view images; and systematically reconstructing the ROI in the reference image based at least on the priority values associated with the plurality of pixels and the dictionary by computing a linear combination of two or more image-patches selected from the plurality of image-patches of the dictionary.

\* \* \* \* \*